(12) United States Patent
Burcea

(10) Patent No.: US 8,031,108 B2
(45) Date of Patent: Oct. 4, 2011

(54) PULSE RADAR RANGING SYSTEM

(75) Inventor: George Burcea, Ajax (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 260 days.

(21) Appl. No.: 12/510,554

(22) Filed: Jul. 28, 2009

(65) Prior Publication Data
US 2010/0019953 A1 Jan. 28, 2010

(30) Foreign Application Priority Data
Jul. 28, 2008 (EP) ..................................... 08013545

(51) Int. Cl.
*G01S 13/10* (2006.01)
*G01S 7/40* (2006.01)
(52) U.S. Cl. ......................... 342/174; 342/124; 342/134
(58) Field of Classification Search .................. 342/124, 342/174
See application file for complete search history.

(56) References Cited

U.S. PATENT DOCUMENTS

| | | | |
|---|---|---|---|
| 3,460,067 A * | 8/1969 | Burnsweig, Jr. .............. | 342/200 |
| 3,962,705 A * | 6/1976 | Jamison ........................ | 342/150 |
| 4,118,703 A * | 10/1978 | Williams ....................... | 342/158 |
| 4,132,991 A | 1/1979 | Wocher | |
| 4,224,622 A * | 9/1980 | Schmidt .......................... | 342/78 |
| 4,315,260 A * | 2/1982 | Kupfer ............................. | 342/86 |
| 4,443,792 A * | 4/1984 | Pidgeon et al. ............... | 342/124 |
| 4,521,778 A | 6/1985 | Knepper | |
| 4,737,791 A * | 4/1988 | Jean et al. ..................... | 342/124 |
| 4,847,623 A * | 7/1989 | Jean et al. ..................... | 342/124 |
| 5,819,164 A * | 10/1998 | Sun et al. ...................... | 455/106 |
| 6,097,329 A * | 8/2000 | Wakayama ................. | 342/26 D |
| 2008/0036649 A1 | 2/2008 | Lyon | |

FOREIGN PATENT DOCUMENTS

| | | |
|---|---|---|
| DE | 42 40 491 A1 | 6/1994 |
| EP | 1 770 409 A1 | 4/2007 |

* cited by examiner

*Primary Examiner* — Thomas Tarcza
*Assistant Examiner* — Matthew M Barker

(57) ABSTRACT

In a pulse radar ranging system, directional coupling means are configured to convey transmit pulses to be transmitted via an antenna to a target and to convey target echoes received by the antenna to a signal mixer that generates an intermediate frequency signal. To embed a reference measurement into the target measurement, the directional coupling means include a four-port circulator with an additional port arranged between a port receiving the transmit pulses and a port coupled to the antenna. A reference line is coupled to the additional port for generating reference echo pulses in response to input pulses. The circulator is configured to split a portion of the transmit pulses to the reference line and to convey there reference echo pulses to the antenna.

2 Claims, 1 Drawing Sheet

US 8,031,108 B2

PULSE RADAR RANGING SYSTEM

CROSS REFERENCE TO RELATED APPLICATIONS

Figure 1:
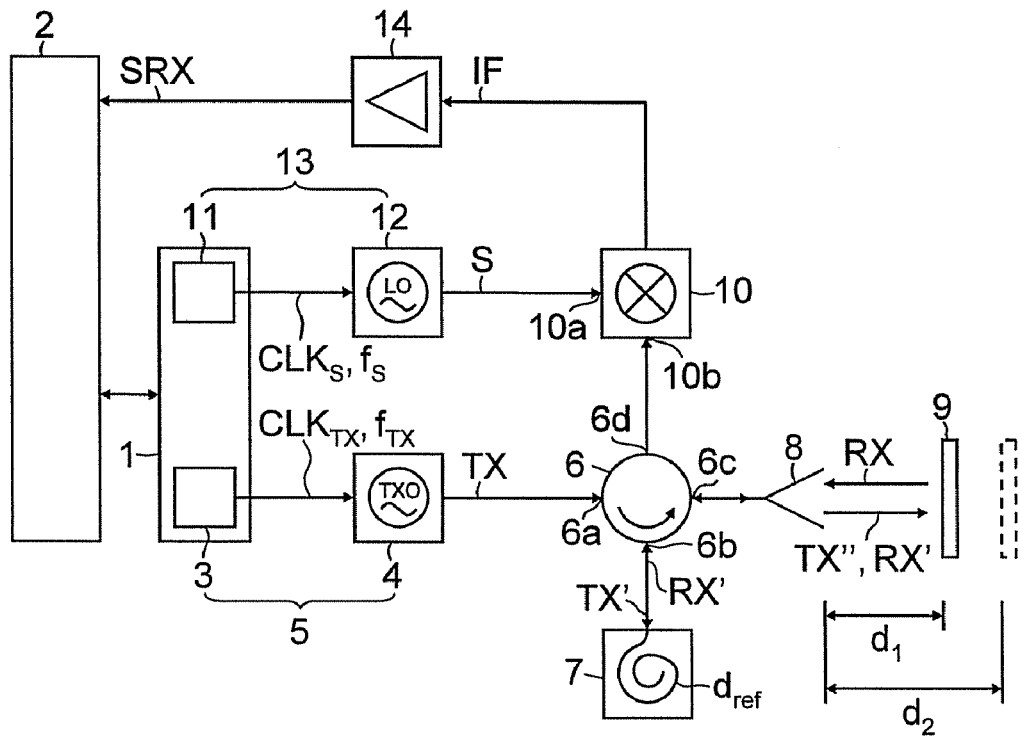

This application claims priority of European Patent Office Application No. 08013545 EP filed Jul. 28, 2008, which is incorporated by reference herein in its entirety.

FIELD OF INVENTION

The present invention relates to a pulse radar ranging system according to the preamble of the claim.

BACKGROUND OF THE INVENTION

Such a pulse radar ranging system is known from U.S. Pat. No. 4,521,778 and U.S. Pat. No. 4,132,991.

Pulse radar ranging systems provide distance or level measurement based on the direct measurement of the running time of microwave pulses transmitted to and reflected from a target, e.g. the surface of a fill material in a container. As the running time for distances of a few meters is in the nanosecond range, a special time transformation procedure is required to enable these short time periods to be measured. The microwave pulses are transmitted to the target at a repetition rate or transmit clock frequency which is given by a transmit clock generator. In a signal mixer, the received echo pulses reflected from the target are sampled by cross-correlation with sampling pulses of the same shape as the transmit pulses but at a sampling clock frequency slightly lower than the transmit clock frequency. The cross-correlation and subsequent integration or low-pass filtering leads to an intermediate frequency (IF) signal corresponding to the received echo pulses but time-expanded relative thereto by a factor $T1/(T1-T2)$, where $T1$ is the transmit pulse repetition period and $T2$ is the sampling period. The time-expansion allows for amplifying, digitizing and further processing of the echo pulses with standard techniques.

One of the sources of errors in pulse radar ranging systems is the temperature drift. Due to variation of the parameters of the semiconductor devices of the pulse radar, the level measurement result will change over the specified temperature range without a real change of the measured level.

From US 2008/0036649 A1 a pulse radar ranging system is known, where a controllable switch, depending on a control signal, either conveys the transmit pulses to the antenna to be transmitted to the target or to a calibration module, preferably a delay line of known delay and terminated with a pulse reflecting impedance mismatch. Thus, the known pulse radar ranging system has two operating modes, wherein a measuring mode is periodically interrupted by a calibration or diagnostic mode. In the calibration or diagnostic mode the equivalent of a reference distance, given by the delay line, is measured. For calibrating the pulse radar, corrections are calculated from the measured reference and are applied to the target measurement results. For diagnostic purposes, the value measured from the reference is checked against an acceptable range. The performance of the switch may impose limitations with respect to frequency range or noise on the measurement function and the calibration or diagnostic function.

SUMMARY OF THE INVENTION

It is therefore an object of the invention to overcome these drawbacks.

According to the invention this object is achieved by the pulse radar ranging system defined in the claim.

Thus, the subject of the invention is a pulse radar ranging system comprising:
- transmit pulse generator means for generating transmit pulses at a transmit clock frequency,
- sampling pulse generator means for generating sampling pulses at a sampling clock frequency slightly different from the transmit clock frequency,
- a signal mixer having a first signal input and a second signal input, said first signal input being coupled to the sampling pulse generator means,
- directional coupling means having ports respectively coupled to the transmit pulse generator means, to an antenna and to the second signal input of the signal mixer,
- signal processing means,
- said directional coupling means being designed to convey the transmit pulses to be transmitted via the antenna to a target and to convey target echoes received by the antenna to the second signal input of the signal mixer,
- said signal mixer being designed to generate a intermediate frequency signal by mixing the echo pulses with the sampling pulses, and
- said signal processing means being designed to evaluate the intermediate frequency signal to determine the target distance, characterized in that
- the directional coupling means comprises a four-port circulator having an additional port arranged between the port coupled to the transmit pulse generator means and the port coupled to the antenna,
- a reference line is coupled to said additional port, said reference line generating reference echo pulses in response to input pulses,
- said four-port circulator is designed to split a portion of the transmit pulses as the input pulses to the reference line and to convey the reference echo pulses to the antenna, and
- said signal processing means is further designed to determine a reference distance between the target echoes generated by the transmit pulses and the target echoes generated by the reference echo pulses.

The invention advantageously uses imperfection of a real circulator, such as cross talk and leakage, to embed the reference measurement into the target measurement. Furthermore, no additional switch is required to switch between the antenna and the reference line.

BRIEF DESCRIPTION OF THE INVENTION

Figure 2:
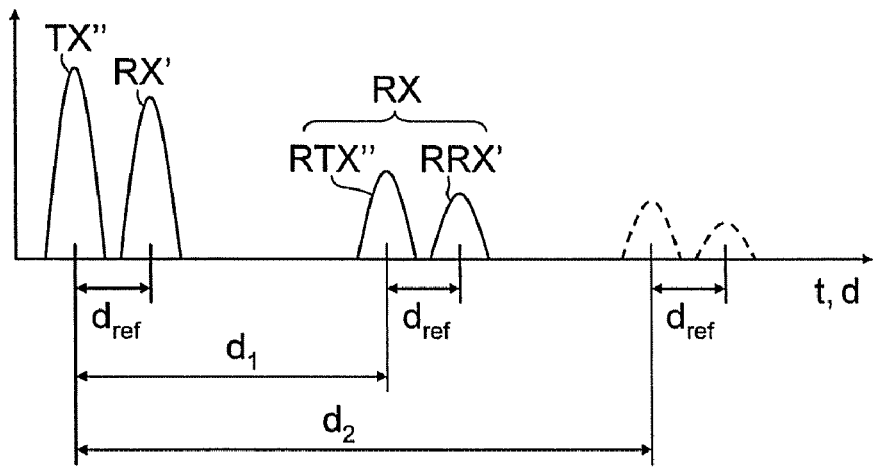

The invention will be now described by way of a preferred example and with reference to the accompanying drawing, in which:

FIG. 1 shows a block diagram of a pulse radar ranging system according to the invention, and FIG. 2 is a timing diagram showing transmit and echo pulses in the pulse radar ranging system.

DETAILED DESCRIPTION OF INVENTION

Reference is first made to FIG. 1 which exemplarily shows the basic components of a pulse radar ranging system according to the invention. A time base control circuit 1, which is under control of a microcontroller 2, contains a transmit clock generator 3 for generating a transmit clock $CLK_{TX}$ at a transmit clock frequency $f_{TX}$ in the MHz range. The transmit clock $CLK_{TX}$ triggers a transmit oscillator 4 for generating microwave transmit pulses TX with a pulse repetition rate equal to the transmit clock frequency $f_{TX}$. The transmit pulses TX may have a duration of 1 ns and a frequency in the GHz range. The transmit clock generator 3 in combination with the transmit oscillator 4 constitute transmit pulse generator means 5 which is coupled to a first port 6a of a directional coupler means in form of a four-port circulator 6. The second port 6b of the circulator 6 is coupled to a reference line 7, which may be any signal delay and reflection means such as a delay line of known delay and terminated with a pulse reflecting impedance mismatch. The third port 6c of the circulator 6 is coupled to an antenna 8

The transmit pulses TX are transmitted through the circulator 6 and an antenna 8 coupled to a third port 6c of the circulator 6 to a target 9, e.g. the surface of a fill material in a container. The target 9 reflects the transmit pulses TX back as echo pulses RX which are received by the antenna 8. The received echo pulses RX are guided through the circulator 6 via a fourth port 6d to the second one, 10b, of two signal inputs 10a, 10b of a signal mixer 10. The time base control circuit 1 further contains a sampling clock generator 11 for generating a sampling clock $CLK_S$ at a sampling clock frequency $f_S$ which is slightly lower (for instance by a few kHz) than the transmit clock frequency $f_{TX}$. The sampling clock $CLK_S$ triggers a local oscillator 12 for generating sampling pulses S of the same shape and frequency as the transmit pulses TX and with a pulse repetition rate equal to the sampling clock frequency $f_S$. The sampling pulses S are conducted to the first signal input 10a of the signal mixer 10 which generates an intermediate frequency signal IF by multiplying the received echo pulses RX by the sampling pulses S. As the pulse repetition rate of the sampling pulses S is slightly lower than that of the transmit pulses TX, the sampling pulses S will sweep in small increments per measuring cycle over the transmit or echo pulse interval so that the received echo pulses RX are sampled by cross-correlation with the sampling pulses S. The cross-correlation and subsequent integration and amplification by an IF amplifier 14 lead to a signal SRX which is expanded in time and in shape corresponds to the received echo pulses RX. This signal SRX is further processed in the microcontroller 2 for determining the running time of the transmit pulses TX to the target 9 and thus the distance d of the target 9 from the antenna 8.

The circulator 6 splits the transmit pulses TX such that a portion TX' thereof is propagated through the second port 6b in the reference line 7 and another portion TX" leaks to the next port 6c to which the antenna 8 is connected. The transmit pulse portion TX' travels through the reference line 7, gets reflected and appears as a reference echo pulse RX' at the port 6b of the circulator 6 from where it is propagated to the antenna 8 at port 6c. Thus, the leaking transmit pulse portion TX" and the reference echo pulse RX' are both sent out to the target 9 and received back (combined signal RX).

FIG. 2 represents a time diagram of the transmit and echo pulses. More exactly, FIG. 2 shows the envelope of the time-expanded signal SRX. As the transmit pulse portion TX' and reference echo pulse RX' leak through the circulator 6 to the mixer 10, they appear in the signal SRX as well as the echo RX from the target 9. The transmit pulse portion TX' and reference echo pulse RX' are emitted from the antenna 8 with a certain delay which corresponds to a reference distance $d_{ref}$ that only depends on the reference line 7. The delay of the combined measurement signal RX, which is composed of the target echo RTX" generated by the transmit pulse TX" and the target echo RRX' generated by the reference echo pulse RX', is variable and depends on the distance d to the target 9. FIG. 2 shows this for two different distances $d_1$ and $d_2$. The reference distance $d_{ref}$ is embedded in the received measurement signal RX and always constant, thus allowing calibration or diagnostics to be performed simultaneously with the distance measurement.

The invention claimed is:

1. A pulse radar ranging system, comprising:
   transmit pulse generator means for generating transmit pulses at a transmit clock frequency;
   sampling pulse generator means for generating sampling pulses at a sampling clock frequency slightly different from the transmit clock frequency;
   a signal mixer having a first signal input and a second signal input, the first signal input being coupled to the sampling pulse generator means;
   an antenna;
   directional coupling means having a first, a second and a third port respectively coupled to the transmit pulse generator means, to the antenna and to the second signal input of the signal mixer; and
   signal processing means,
   wherein the directional coupling means are configured to convey the transmit pulses to be transmitted via the antenna to a target and to convey echo pulses received by the antenna to the second signal input of the signal mixer,
   wherein the signal mixer is configured to generate an intermediate frequency signal by mixing the echo pulses with the sampling pulses,
   wherein the signal processing means are configured to evaluate the intermediate frequency signal to determine the target distance,
   wherein the directional coupling means include a four-port circulator with an additional fourth port arranged between the first port coupled to the transmit pulse generator means and the second port coupled to the antenna,
   wherein a reference line is coupled to the fourth port, the reference line generating reference echo pulses in response to input pulses,
   wherein the four-port circulator is configured to split a portion of the transmit pulses as the input pulses to the reference line and to convey the reference echo pulses to the antenna, and
   wherein the signal processing means is further configured to determine a reference distance between target echoes generated by the transmit pulses and target echoes generated by the reference echo pulses.

2. A method of providing a distance or level measurement based upon a direct measurement of a running time of microwave pulses, comprising:
   generating transmit pulses at a transmit clock frequency;
   generating sampling pulses at a sampling clock frequency slightly different from the transmit clock frequency;
   conveying the transmit pulses by directional coupling means;
   transmitting the transmit pulses via an antenna to a target;
   receiving echo pulses by the antenna;
   conveying the echo pulses received by the antenna to a second signal input of a signal mixer;
   generating an intermediate frequency signal by mixing the echo pulses with the sampling pulses by the signal mixer;
   evaluating the intermediate frequency signal to determine a target distance,
   generating reference echo pulses by a reference line coupled to a port of a four-port circulator, the reference line generating the reference echo pulses in response to input pulses, wherein a portion of the transmit pulses is split as the input pulses to the reference line by the four-port circulator;

conveying the reference echo pulses to the antenna by the four-port circulator; and determining a reference distance between target echoes generated by the transmit pulses and target echoes generated by the reference echo pulses.

\* \* \* \* \*